(12) United States Patent
Hubbard et al.

(10) Patent No.: US 12,503,856 B2
(45) Date of Patent: Dec. 23, 2025

(54) THERMOPLASTIC ROOFING MEMBRANES FOR FULLY-ADHERED ROOFING SYSTEMS

(71) Applicant: Amrize Technology Switzerland LLC, Zug (CH)

(72) Inventors: Michael J. Hubbard, Goshen, IN (US); Hao Wang, Carmel, IN (US); Carl E. Watkins, Jr., Mount Juliet, TN (US); Donna M. Tippmann, Fishers, IN (US); Jeffrey W. Henegar, Akron, OH (US)

(73) Assignee: Amrize Technology Switzerland LLC, Zug (CH)

( * ) Notice: Subject to any disclaimer, the term of this patent is extended or adjusted under 35 U.S.C. 154(b) by 0 days.

(21) Appl. No.: 18/479,076

(22) Filed: Oct. 1, 2023

(65) Prior Publication Data
US 2024/0052639 A1 Feb. 15, 2024

Related U.S. Application Data

(63) Continuation of application No. 17/132,287, filed on Dec. 23, 2020, now abandoned, which is a
(Continued)

(51) Int. Cl.
*E04D 11/02* (2006.01)
*B32B 7/12* (2006.01)
(Continued)

(52) U.S. Cl.
CPC .............. *E04D 11/02* (2013.01); *B32B 7/12* (2013.01); *B32B 25/16* (2013.01); *E04B 1/665* (2013.01);
(Continued)

(58) Field of Classification Search
CPC ......... B29C 48/71; B29C 48/49; B29C 48/15; B29C 48/0016; B29C 48/0014;
(Continued)

(56) References Cited

U.S. PATENT DOCUMENTS

| | | |
|---|---|---|
| 4,141,187 A | 2/1979 | Graves |
| 4,957,968 A | 9/1990 | Adur et al. |

(Continued)

FOREIGN PATENT DOCUMENTS

| | | |
|---|---|---|
| CN | 101668808 A | 3/2010 |
| EP | 1245620 A2 | 10/2002 |

(Continued)

OTHER PUBLICATIONS

International Search Report and Written Opinion for Appl. No. PCT/US2014/069988 dated Mar. 5, 2015, p. 1-4.
(Continued)

*Primary Examiner* — Stella K Yi
(74) *Attorney, Agent, or Firm* — Renner, Kenner; Arthur M. Reginelli

(57) ABSTRACT

A roof system comprising a substrate and thermoplastic membrane adhered to the substrate, where the thermoplastic membrane is characterized, prior to being adhered to the substrate, by a stiffness represented by a flexural modulus of less than 90 MPa, or by a Taber stiffness of less than 15, or by a Shore D hardness of less than 40, or by a combination of a flexural modulus of less than 90 MPa, a Taber stiffness of less than 15, and a Shore D hardness of less than 40.

18 Claims, 2 Drawing Sheets

Related U.S. Application Data continuation of application No. 16/108,282, filed on Aug. 22, 2018, now Pat. No. 10,907,355, which is a continuation of application No. 15/306,537, filed as application No. PCT/US2015/027698 on Apr. 27, 2015, now abandoned.

(60) Provisional application No. 61/984,306, filed on Apr. 25, 2014.

(51) Int. Cl.
*B32B 25/16* (2006.01)
*E04B 1/66* (2006.01)
*E04D 5/06* (2006.01)
*E04D 5/10* (2006.01)
*E04D 5/14* (2006.01)

(52) U.S. Cl.
CPC ............. *E04D 5/06* (2013.01); *E04D 5/10* (2013.01); *E04D 5/148* (2013.01); *B32B 2307/536* (2013.01); *B32B 2307/546* (2013.01); *B32B 2419/06* (2013.01)

(58) Field of Classification Search
CPC .......... B29C 48/22; B29C 48/21; B29C 48/16; B29C 44/02; B29C 44/3446
See application file for complete search history.

(56) References Cited

U.S. PATENT DOCUMENTS

| | | | |
|---|---|---|---|
| 5,437,923 A | 8/1995 | Kalkanoglu |
| 5,573,092 A | 11/1996 | Gabilondo |
| 5,624,999 A | 4/1997 | Lombardi et al. |
| 5,891,563 A | 4/1999 | Letts |
| 5,927,258 A | 7/1999 | Clauss et al. |
| 6,044,604 A | 4/2000 | Clayton et al. |
| 6,117,375 A | 9/2000 | Garrett et al. |
| 6,414,070 B1 | 7/2002 | Kausch et al. |
| 6,503,984 B2 | 1/2003 | Johnson et al. |
| 6,544,909 B1 | 4/2003 | Venkataswamy et al. |
| 6,656,982 B2 | 12/2003 | Yasuda |
| 6,720,067 B2 | 4/2004 | Takahashi et al. |
| 6,927,258 B2 | 8/2005 | Datta et al. |
| 7,355,089 B2 | 4/2008 | Chang et al. |
| 7,387,753 B2 | 6/2008 | Tackett et al. |
| 7,579,397 B2 | 8/2009 | Nelson |
| 7,612,120 B2 | 11/2009 | Letts |
| 7,666,491 B2 | 2/2010 | Yang |
| 7,741,397 B2 | 6/2010 | Liang et al. |
| 7,838,568 B2 | 11/2010 | Letts et al. |
| 7,882,671 B2 | 2/2011 | Bruce et al. |
| 7,893,166 B2 | 2/2011 | Shan et al. |
| 7,964,672 B2 | 6/2011 | Ouhadi |
| 8,440,284 B2 | 5/2013 | Kelly |
| 9,045,904 B2 | 6/2015 | Hubbard et al. |
| 9,434,827 B2 | 9/2016 | Frei et al. |
| 10,907,355 B2 | 2/2021 | Hubbard et al. |
| 2002/0013379 A1 | 1/2002 | Singh et al. |
| 2002/0049266 A1 | 4/2002 | Yasuda |
| 2003/0032351 A1 | 2/2003 | Horner |
| 2003/0082365 A1 | 5/2003 | Geary et al. |
| 2003/0153656 A1 | 8/2003 | Sjerps |
| 2003/0198813 A1 | 10/2003 | Howell |
| 2004/0033741 A1 | 2/2004 | Peng |
| 2004/0109983 A1 | 6/2004 | Rotter et al. |
| 2004/0146681 A1 | 7/2004 | Naipawer, III et al. |
| 2004/0198912 A1 | 10/2004 | Dharmarajan et al. |
| 2004/0248751 A1 | 12/2004 | Johnson et al. |
| 2005/0183365 A1 | 8/2005 | Naipawer, III et al. |
| 2006/0046084 A1 | 3/2006 | Yang et al. |
| 2006/0127664 A1 | 6/2006 | Geary et al. |
| 2006/0179749 A1 | 8/2006 | Brandt et al. |
| 2006/0199930 A1 | 9/2006 | Li Pi Shan et al. |
| 2007/0193167 A1 | 8/2007 | Bruce et al. |
| 2007/0194482 A1* | 8/2007 | Douglas ................ B32B 27/32 264/173.14 |
| 2008/0179574 A1 | 7/2008 | Yang et al. |
| 2008/0206583 A1 | 8/2008 | Phan et al. |
| 2009/0049802 A1 | 2/2009 | Johnson et al. |
| 2009/0137168 A1* | 5/2009 | Peng ................... C08L 23/0815 525/240 |
| 2009/0181216 A1 | 7/2009 | Peng |
| 2009/0255573 A1 | 10/2009 | Taylor |
| 2009/0269565 A1 | 10/2009 | Peng |
| 2009/0275690 A1 | 11/2009 | Weaver et al. |
| 2010/0029827 A1 | 2/2010 | Ansems et al. |
| 2010/0084158 A1 | 4/2010 | Gau et al. |
| 2010/0125114 A1 | 5/2010 | Williams et al. |
| 2010/0197844 A1 | 8/2010 | Yang et al. |
| 2011/0003094 A1 | 1/2011 | Becker |
| 2011/0118404 A1 | 5/2011 | Jung et al. |
| 2011/0139340 A1 | 6/2011 | Naipawer, III et al. |
| 2011/0206973 A1 | 8/2011 | Brandt et al. |
| 2012/0045623 A1 | 2/2012 | Delaney |
| 2012/0167510 A1 | 7/2012 | Brandt et al. |
| 2012/0244340 A1 | 9/2012 | Peng |
| 2013/0036694 A1 | 2/2013 | Brandt et al. |
| 2013/0164524 A1 | 6/2013 | Letts et al. |
| 2013/0252005 A1 | 9/2013 | Savargaonikar et al. |
| 2013/0296497 A1 | 11/2013 | Jeong et al. |
| 2014/0011008 A1 | 1/2014 | Letts et al. |
| 2014/0127443 A1 | 5/2014 | Zhou |
| 2014/0150960 A1 | 6/2014 | Peng |
| 2014/0302295 A1 | 10/2014 | Thies et al. |
| 2014/0373467 A1 | 12/2014 | Wang et al. |
| 2015/0038629 A1 | 2/2015 | Ultsch |
| 2015/0119515 A1 | 4/2015 | Frei et al. |
| 2015/0152643 A1 | 6/2015 | Hubbard |
| 2015/0174871 A1 | 6/2015 | Sollmann |
| 2015/0314511 A1 | 11/2015 | Stoiljkovic et al. |
| 2016/0024794 A1 | 1/2016 | Jenkins et al. |
| 2016/0207283 A1 | 7/2016 | Wang |
| 2016/0312470 A1 | 10/2016 | Wang et al. |
| 2017/0044770 A1 | 2/2017 | Hubbard et al. |
| 2017/0203555 A1 | 7/2017 | Wang et al. |
| 2018/0023301 A1 | 1/2018 | Wang et al. |
| 2018/0094439 A1 | 4/2018 | Wang et al. |
| 2018/0162109 A1 | 6/2018 | Gopalan et al. |
| 2018/0162971 A1 | 6/2018 | Chen et al. |
| 2018/0355616 A1 | 12/2018 | Hubbard et al. |
| 2019/0003184 A1 | 1/2019 | Wang et al. |
| 2019/0003185 A1 | 1/2019 | Wang et al. |

FOREIGN PATENT DOCUMENTS

| | | | |
|---|---|---|---|
| EP | 1655331 A1 | 5/2006 |
| WO | 2001066627 A1 | 9/2001 |
| WO | 2001096110 A1 | 12/2001 |
| WO | 2003016168 A1 | 2/2003 |
| WO | 2007136761 A1 | 11/2007 |
| WO | 2013102208 A1 | 7/2013 |
| WO | 2014001224 A1 | 1/2014 |
| WO | 2014008501 A1 | 1/2014 |
| WO | 2014078760 A1 | 5/2014 |
| WO | 2014105809 A1 | 7/2014 |
| WO | 2015089384 A1 | 6/2015 |
| WO | 2015164852 A1 | 10/2015 |

OTHER PUBLICATIONS

ASTM D 6878-03 standard, 2003, 3 Pages. (Year: 2003).
International Search Report and Written Opinion for Appl. No. PCT/US2016/016975 dated Apr. 26, 2016.
International Search Report and Written Opinion for Appl. No. PCT/US2015/027698 dated Jul. 30, 2015, pp. 1-10.
International Search Report and Written Opinion for Appl. No. PCT/US2015/041707 dated Sep. 8, 2015, pp. 1-3.
International Search Report and Written Opinion for Appl. No. PCT/US2016/069073 dated Apr. 3, 2017, pp. 1-10.
International Search Report and Written Opinion for Appl. No. PCT/US2016/016960 dated Apr. 26, 2016.

(56) References Cited

OTHER PUBLICATIONS

Thermal Tech Equipment. Shore Durometer Conversion Chart, Jun. 13, 2003, p. 1.
U.S. Appl. No. 15/548,912.
U.S. Appl. No. 15/548,938.
U.S. Appl. No. 15/306,537.
U.S. Appl. No. 16/108,282.
U.S. Appl. No. 16/066,699.
U.S. Appl. No. 16/066,828.
U.S. Appl. No. 15/103,542.
U.S. Appl. No. 15/327,867.
PCT Application No. PCT/US2020/013529.
PCT Application No. PCT/US2020/017410.

* cited by examiner

THERMOPLASTIC ROOFING MEMBRANES FOR FULLY-ADHERED ROOFING SYSTEMS

This application is a continuation application of U.S. application Ser. No. 17/132,287 filed on Dec. 23, 2020, which is a is a continuation application of U.S. application Ser. No. 16/108,282 filed on Aug. 22, 2018 and issued as U.S. Pat. No. 10,907,355, which is a continuation application of abandoned U.S. application Ser. No. 15/306,537 filed on Oct. 25, 2016, which is a U.S. National-Stage Application of PCT/US2015/027698 filed on Apr. 27, 2015, and claims the benefit of U.S. Provisional Application No. 61/984,306 filed on Apr. 25, 2014, which are incorporated herein by reference.

FIELD OF THE INVENTION

Embodiments of the present invention provide thermoplastic roofing membranes that are useful for fully-adhered roofing systems and fully-adhered roofing systems prepared therewith; the overall membranes are characterized by an advantageously low stiffness.

BACKGROUND OF THE INVENTION

Thermoplastic roofing membranes, especially those membranes engineered to cover flat or low-sloped roofs, are known in the art. In fact, many of these membranes are engineered to meet the industry standards defined in ASTM D 790. Among the performance requirements provided in this industry standard, thermoplastic roofing membranes must meet threshold requirements for tensile strength and tear strength. Tensile strength is an indicator of seam strength, and the seam strength must withstand wind uplift forces. Tear strength is primarily important from the standpoint of fastener pull through. That is, where the membrane is mechanically attached to the roof surface, the membrane must be able to withstand threshold wind uplift forces without tear at the location of the fastener.

Many commercially-available thermoplastic roofing membranes include fabric-reinforced thermoplastic sheets. These membranes are fabricated by sandwiching a reinforcing fabric between two extruded thermoplastic sheets to provide a laminated structure. The thermoplastic extruded sheets, which can be the same or different, often include ethylene-propylene reactor copolymers (e.g. CA10A available from Lyondellbasell), together with various additives, such as inert filler, anti-weathering additives, and flame retardants. As the skilled person appreciates, the type and amount of additives employed, such as the filler, can impact the mechanical properties of the membrane including tensile and tear strength.

While industry standards for thermoplastic roofing membranes are designed with an eye toward mechanically-attached thermoplastic roofing systems, fully-adhered systems also exist. In fact, fully-adhered systems are often viewed as superior roof systems. As the skilled person appreciates, a fully-adhered system is installed by using an adhesive that attaches the membrane to the roof surface, where the adhesive substantially contacts all of the membrane surface adjacent to the roof deck. In practice, liquid bond adhesives or pressure-sensitive adhesives that are factory applied to the membrane are often used.

A problem encountered when installing fully-adhered thermoplastic roofing sheets relates to the stiffness of the roofing sheet. As the skilled person appreciates, the integrity of a fully-adhered system can hinge on the degree to which the overall surface of the membrane is adhered. Where areas or pockets exist that are not adhered, the system can fail wind uplift tests. This is particularly true where the membrane is not fully adhered over uneven surfaces in the roof, such as fastening plates that are often used to secure underlying insulation boards. The skilled person understands that the stiffness of the sheet creates problems when attempting to evenly apply the sheet over the roof surface, especially uneven substrates. A goal often sought is the ability to view the underlying contours of the roof surface though the membrane, which is indicative of complete adhesion to the roof. Where the membrane is too stiff, the membrane will not contour to the underlying surface. A term often used in the art is telegraphing, which refers to the ability of the sheet to contour to the substrate and thereby allow the presence of the substrate to be noticed with the sheet in place.

Roofing membranes prepared from propylene-based copolymers are known. For example, U.S. Publ. No. 2010/0197844 teaches non-reinforced TPO membranes, wherein the TPO may be prepared according to U.S. Pat. No. 6,927,258, which discloses polymeric blends including a first polymer having a melt temperature above 110° C. and a heat of fusion of at least 75 J/g, and a second polymer having a melting point of less than 105° C. and a heat of fusion of less than 75 J/g. Similar propylene-based elastomers are disclosed in U.S. Publ. No. 2004/0198912, which discloses membranes, such as roof sheeting, formed from a blend of a first polymer having a melting point from 25° C. to 70° C., and a heat of fusion from 2 J/g to 25 J/g, a second polymer having a melting point greater than 130° C. and heat of fusion of greater than 80 J/g, from 1 to 40% by weight inorganic filler, and from 1 to 25% by weight processing oil.

SUMMARY OF THE INVENTION

One or more embodiments of the present invention provide a roof system comprising a substrate and thermoplastic membrane adhered to the substrate, where the thermoplastic membrane is characterized, prior to being adhered to the substrate, by a stiffness represented by a flexural modulus of less than 90 MPa, or by a Taber stiffness of less than 15, or by a Shore D hardness of less than 40, or by a combination of a flexural modulus of less than 90 MPa, a Taber stiffness of less than 15, and a Shore D hardness of less than 40.

DETAILED DESCRIPTION OF ILLUSTRATIVE EMBODIMENTS

Embodiments of the present invention are based, at least in part, on the discovery of thermoplastic roofing membranes that can advantageously be used for fully-adhered roofing systems. These membranes are characterized by a relatively low stiffness (as may be indicated by low flexural modulus), which allows the membranes to be installed using fully-adhered attachment techniques while overcoming installation problems associated with stiffness. While the relatively low stiffness carries with it a corresponding loss in certain mechanical properties, it has unexpectedly been discovered that the overall balance of properties is sufficient to provide technologically useful fully-adhered systems. For example, while low stiffness may be associated with a corresponding loss in fastener pull-through strength or resistance, the fact that the membrane systems are fully adhered diminishes the deleterious impact caused by this loss in property. Accordingly, embodiments of the invention are directed toward fully-adhered roof systems that include membranes having relatively low stiffness as described herein.

Membrane Construction

Figure 1:
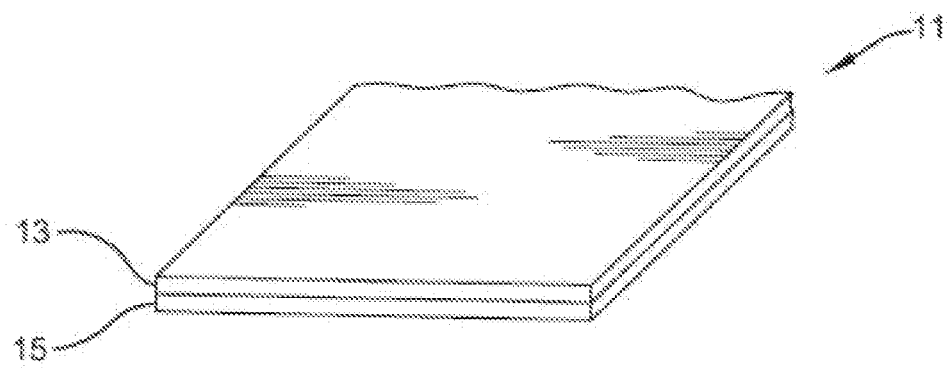
FIG. 1 is a perspective view of a single-extrudate membrane according to embodiments of the present invention.

Membranes according to one or more embodiments of the present invention can be described with reference to FIG. 1. In this embodiment, the membrane includes planar body 11, which also may be referred to as sheet 11 or panel 11. In this embodiment, panel 11 is a planar body that consists of a single extrudate. In one or more embodiments, planar body 11 may be compositionally homogeneous or, in other embodiments, planar body 11 may include one or more compositionally distinct layers 13 and 15. For example, compositionally distinct layers 13 and 15 may be formed through coextrusion techniques, and reference may therefore be made to coextruded layers 13 and 15, or first coextruded layer 13 and second coextruded layer 15.

Figure 2:
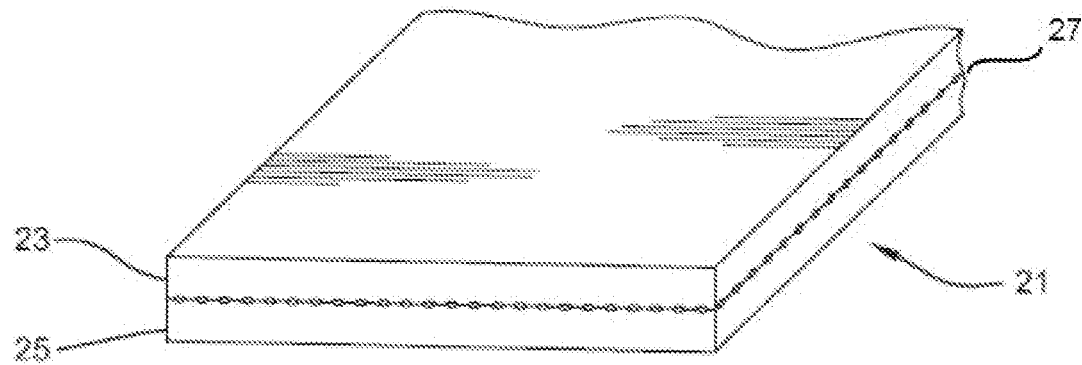
FIG. 2 is a perspective view of a laminate membrane according to embodiments of the present invention.
Figure 3:
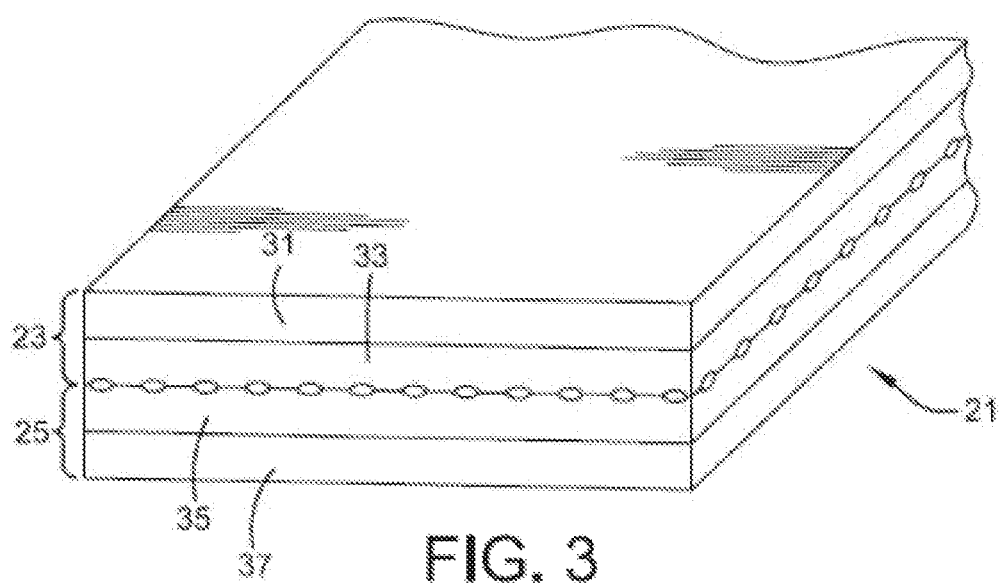
FIG. 3 is a perspective view of laminate membrane according to embodiments of the present invention.

In other embodiments, the membranes of one or more embodiments of the present invention may include two or more laminated layers. For example, as shown in FIG. 2, membrane 21 may include first layer 23 and second layer 25, which are laminated to one another, optionally with a reinforcing scrim 27 disposed between laminated layers 23 and 25. First layer 23 and second layer 25 may be compositionally similar with respect to one another. Or, in other embodiments, the layers may be compositionally distinct. Additionally, layers 23 and 25 may, within themselves, be compositionally homogeneous or, in other embodiments, they may be nonhomogeneous. For example, either first layer 23, second layer 25, or both layers 23 and 25, may include compositionally distinct coextruded layers. In this respect, U.S. Publ. Nos. 2009/0137168, 2009/0181216, 2009/0269565, 2007/0193167, and 2007/0194482 are incorporated herein by reference. As shown in FIG. 3, first layer 23 may include compositionally distinct coextruded layers 31 and 33, and second layer 25 may include compositionally distinct coextruded layers 35 and 37.

As will be discussed in greater detail below, one or more layers of the membranes of this invention include a propylene-based elastomer. With reference to FIG. 3, these one or more layers may include upper middle layer 33, as well as lower middle layer 35 and bottom layer 37. In these or other embodiments, top layer 31 may also include the propylene-based elastomer. In certain embodiments, top layer 31 includes a propylene-based polymer that is distinct from a propylene-based elastomer, such as a propylene-based olefinic polymer as will be described in greater detail below. In these or other embodiments, top layer 31 is devoid of a propylene-based elastomer. Additionally, in certain embodiments, bottom layer 37 may include a functionalized thermoplastic resin. In one or more embodiments, top layer 31 includes flame retardants and other weathering additives that may provide sufficient environmental protection to the polymers, while at least one of layers 33, 35, and 37 may include fillers such as mineral fillers.

Membrane Characteristics

As discussed above, the membranes employed in the practice of this invention are advantageously characterized by a relatively low stiffness. In one or more embodiments, the low stiffness may be represented by a relatively low flexural modulus, as determined by ASTM D790. In other words, relatively low flexural modulus is indicative of low stiffness. For example, the membranes of one or more embodiments of this invention may have a flexural modulus, according to ASTM D790, of less than 90 MPa, in other embodiments less than 80 MPa, in other embodiments less than 70 MPa, in other embodiments less than 60 MPa, in other embodiments less than 50 MPa, in other embodiments less than 40 MPa, and in other embodiments less than 30 MPa. In these or other embodiments, the membranes may be characterized by a flexural modulus of from about 5 to about 90 MPa, in other embodiments from about 10 to about 80 MPa, and in other embodiments from about 20 to about 70 MPa.

In these or other embodiments, the relatively low stiffness of the membranes of this invention may be represented by a relatively low Shore hardness (e.g. low Shore A or Shore D). For example, the membranes may be characterized by a Shore D hardness, as determined by ASTM D2240, of less than 40, in other embodiments less than 30, and in other embodiments less than 20. In these or other embodiments, the membranes may be characterized by a hardness of from about 70 Shore A to about 40 Shore D, in other embodiments from about 80 Shore A to about 30 Shore D, and in other embodiments from about 90 Shore A to about 20 Shore D.

In these or other embodiments, the relatively low stiffness of the membranes of this invention may be represented by a relatively low Taber stiffness. As the skilled person appreciates, Taber stiffness is an advantageous measurement for reinforced membrane materials because the measurements can be taken on samples that include a fabric reinforcement. The skilled person understands that these Taber stiffness values can be obtained by employing a Taber stiffness tester, such as a model 510-E Taber V-5 stiffness tester. The skilled person understands that the results of the Taber stiffness test are reported in stiffness units with lower values representing membranes of lower stiffness. In one or more embodiments, the membranes employed in practice of the present invention may be characterized by a Taber stiffness of less than 15, in other embodiments less than 12, in other embodiments less than 8, in other embodiments less than 6, and in other embodiments less than 4. In these or other embodiments, the membranes may be characterized by a stiffness of from about 1 to about 15, in other embodiments from about 2 to about 10, and in other embodiments from about 3 to about 6. In one or more embodiments, the Taber stiffness values of the membranes of the present invention are at least 100%, in other embodiments at least 120%, and in other embodiments at least 150% lower than comparative membranes prepared using propylene-based thermoplastic polyolefins such as reactor copolymers as described herein.

Membrane Composition

Propylene-Based Elastomer

In one or more embodiments, the advantageously low stiffness is attributable to the polymeric composition of one or more layers of the membrane. In one or more embodiments, the polymeric composition of one or more layers includes a propylene-based elastomer. In these or other embodiments, the polymeric composition includes a blend of a propylene-based elastomer and a propylene-based thermoplastic resin. In one or more embodiments, both propylene-based elastomer and the propylene-based thermoplastic resin have isotactic propylene sequences long enough to crystallize. In this regard, U.S. Pat. No. 6,927,258, and U.S. Publ. Nos. 2004/0198912 and 2010/0197844 are incorporated herein by reference.

In one or more embodiments, the propylene-based elastomer is propylene/alpha-olefin copolymer with semi-crystalline isotactic propylene segments. The alpha-olefin content (e.g. polymerized ethylene content) may range from about 5 to about 18%, or in other embodiments from about 10 to about 15%.

In one or more embodiments, the propylene-based elastomer is characterized by a melting point that is less than 110° C. and a heat of fusion of less than 75 J/g.

In one embodiment, the propylene based elastomers of the present invention have a glass transition temperature (Tg) in the range of about −25 to −35° C. The Tg as used herein is the temperature above which a polymer becomes soft and pliable, and below which it becomes hard and glassy. The propylene-based elastomers may have a MFR range measured at 230° C. of between about 0.5 to about 25, and a melt temperature range of about 50 to 120° C.

In one embodiment, the propylene-based elastomers of the present invention have a shore A hardness range of about 60 to about 90.

In those embodiments where the propylene-based elastomer is blended with a propylene-based thermoplastic resin, the propylene-based thermoplastic resin may include a crystalline resin. In particular embodiments, the propylene-based thermoplastic resin is characterized by a melting point that is greater than 110° C. and a heat of fusion greater than 75 J/g. In one or more embodiments, the propylene-based thermoplastic resin is stereoregular polypropylene. In one or more embodiments, the weight ratio of the propylene-based elastomer to the thermoplastic resin within the blend may vary in the range of 1:99 to 95:5 by weight and, in particular, in the range 2:98 to 70:30 by weight.

In one embodiment, the propylene-based elastomers of the present invention have a flexural modulus range of about 500 to about 6000 Psi, or in other embodiments about 1500 to about 5000 psi.

Filler

In one or more embodiments, one or more layers of the membranes employed in practicing the present invention may include one or more filler materials including, but not limited to, mineral fillers. In one or more embodiments, these fillers may include inorganic materials that may aid in reinforcement, heat aging resistance, green strength performance, and/or flame resistance. In other embodiments, these materials are generally inert with respect to the composition and therefore simply act as diluent to the polymeric constituents. In one or more embodiments, mineral fillers include clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, and mixtures thereof.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, the fillers are not surface modified or surface functionalized.

In one or more embodiments, the mineral fillers are characterized by an average particle size of at least 1 μm, in other embodiments at least 2 μm, in other embodiments at least 3 μm, in other embodiments at least 4 μm, and in other embodiments at least 5 μm. In these or other embodiments, the mineral fillers are characterized by an average particle size of less than 15 μm, in other embodiments less than 12 μm, in other embodiments less than 10 μm, and in other embodiments less than 8 μm. In these or other embodiments, the mineral filler has an average particle size of between 1 and 15 μm, in other embodiments between 3 and 12 μm, and in other embodiments between 6 and 10 μm.

Other Ingredients

One or more layers of the thermoplastic membranes employed in the practice of this invention may also include other ingredients such as those that are conventional in thermoplastic membranes. For example, other useful additives or constituents may include flame retardants, stabilizers, pigments, and fillers.

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, one or more layers of the membranes employed in this invention may include stabilizers. Stabilizers may include one or more of a UV stabilizer, an antioxidant, and an antiozonant. UV stabilizers include Tinuvin™ 622. Antioxidants include Irganox™ 1010.

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO 2014/078760, which is incorporated herein by reference.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Pat. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments.

Organic swelling agents that can be used to treat the clay include quaternary ammonium compound, excluding pyridinium ion, such as, for example, poly(propylene glycol)bis(2-aminopropyl ether), poly(vinylpyrrolidone), dodecylamine hydrochloride, octadecylamine hydrochloride, and dodecylpyrrolidone. These treated clays are commercially available. One or more of these swelling agents can be used.

Functionalized Polymers

In one or more embodiments, one or more layers of the membranes employed in practice of this invention includes a functionalized polymer. In one or more embodiments, the functionalized polymer is a thermoplastic polymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature (T c) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 10% by weight, in other embodiments less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil). Another examples includes polymers or oligomers including one or more glycidyl methacrylate groups such as Lotader™ AX8950 (Arkema).

Conventional Thermoplastic Resin

In one or more embodiments, one or more layers of the membranes employed in the present invention may include a conventional thermoplastic resin. In one or more embodiments, a conventional thermoplastic resin may be distinguished from the propylene-based elastomer based upon melt temperature and heat of fusion. In one or more embodiments, the conventional thermoplastic resin may have a heat of fusion that is greater than 75 J/g, in other embodiments greater than 80 J/g, and in other embodiments greater than 85 J/g. In these or other embodiments, the conventional thermoplastic resin may have a melt temperature that is greater than 105° C., in other embodiments greater than 110° C., and in other embodiments greater than 115° C.

In one or more embodiments, the conventional thermoplastic polymer may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. Other useful thermoplastic olefins include those available under the tradename T00G-00 (Ineos). In one or more embodiments, the in-reactor copolymers may be physically blended with other polyolefins. For example, in reactor copolymers may be blended with linear low density polyethene.

Amounts

Filler

In one or more embodiments, the one or more layers of the membranes employed in the present invention include at least 10 weight percent, in other embodiments at least 15 weight percent, in other embodiments at least 20 weight percent, in other embodiments at least 25 weight percent, in other embodiments at least 30 weight percent, 33 weight percent, in other embodiments at least 40 weight percent, and in other embodiments at least 45 weight percent of the filler (e.g. mineral filler) based on the entire weight of the given layer of the membrane that includes the filler. In one or more embodiments, one or more layers of the membranes of the present invention include at most 80 weight percent, in other embodiments at most 70 weight percent, and in other embodiments at most 60 weight percent of the filler based on the entire weight of the given layer of the membrane that includes the filler. In one or more embodiments, one or more layers of the membranes of the present invention include from about 33 to about 80, in other embodiments from about 40 to about 70, and in other embodiments from about 45 to about 60 weight percent of the filler based upon the entire weight of the given layer of the membrane that includes the filler.

Functionalized Polymer

In one or more embodiments, the one or more layers of the membranes of the present invention that include the functionalized polymer include at least 1 weight percent, in other embodiments at least 2 weight percent, in other embodiments at least 3 weight percent, in other embodiments at least 5 weight percent, and in other embodiments at least 7 weight percent of the functionalized polymer (e.g. hydroxyl-bearing polymer) based on the entire weight of the given layer of the membrane that includes the functionalized polymer. In one or more embodiments, the one or more layers of the membranes of the present invention that include the functionalized polymer include at most 50 weight percent, in other embodiments at most 25 weight percent, and in other embodiments at most 15 weight percent of the functionalized polymer based on the entire weight of the given layer of the membrane that includes the functionalized polymer. In one or more embodiments, the one or more layers of the membranes of the present invention that include the functionalized polymer include from about 3 to about 50, in other embodiments from about 5 to about 25, and in other embodiments from about 7 to about 15 weight percent of the functionalized polymer based upon the entire weight of the given layer of the membrane that includes the functionalized polymer.

SPECIFIC EMBODIMENTS

Specific embodiments of the membranes employed in the practice of the present invention can be described with reference to FIG. 3. In one or more embodiments, the membranes employed in the present invention may include propylene-based elastomer in upper-middle layer 33, lower-middle layer 35, optionally top layer 31, and optionally bottom layer 37. In particular embodiments, while upper-middle layer 33 and lower middle layer 35 may include propylene-based elastomer, top layer 31 includes conventional thermoplastic polymer. In particular embodiments, the polymeric component of top layer 31 includes at least 90%, in other embodiments at least 95%, and in other embodiments at least 99% conventional thermoplastic polymer.

In one or more embodiments, bottom layer 37 includes functionalized thermoplastic polymer. In one or more embodiments, bottom layer 37 includes from about 1 to about 10, in other embodiments from about 3 to about 8, and in other embodiments from about 4 to about 6% by weight functionalized thermoplastic polymer, based upon the entire weight of the layer.

In one or more particular embodiments, top layer 31, upper-middle layer 33, lower-middle layer 35, and bottom layer 37 may include distinct amounts of one or more distinct or similar fillers. For example, in one or more embodiments, top layer 31 may include from about 15 to about 50, in other embodiments from about 20 to about 40, and in other embodiments from about 25 to about 35% by weight magnesium hydroxide filler, based on the entire weight of the layer, while upper-middle layer 33, lower-middle layer 35, and bottom layer 37 include less than 20, in other embodiments less than 10, and in other embodiments less than 5% by weight magnesium hydroxide filler, based upon the entire weight of the respective layers.

In one or more particular embodiments, at least one of upper-middle layer 33, lower-middle layer 35, and bottom layer 37 individually include, or in certain embodiments each of layers 33, 35, and 37 include, from about 25 to about 75, in other embodiments from about 35 to about 65, and in other embodiments from about 45 to about 65% by weight calcium carbonate filler, based on the entire weight of the layer.

Method of Making

In one or more embodiments, the membranes employed in the present invention may be prepared by employing conventional techniques. For example, the various ingredients can be separately fed into an extruder and extruded into membrane and, optionally, laminated into a laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched there between to form a laminate. In one or more embodiments, the membranes of the present invention are prepared by employing co-extrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include propylene-based elastomer, filler, and functionalized polymers defined herein. The ingredients may be mixed together by employing conventional polymer mixing equipment and techniques. In one or more embodiments, an extruder may be employed to mix the ingredients. For example, single-screw or twin-screw extruders may be employed.

Fully-Adhered Roofing System

Figure 4:
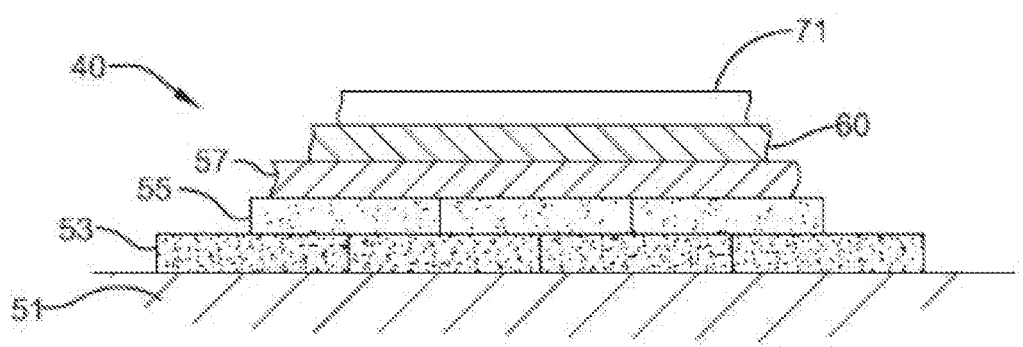
FIG. 4 is a cross-sectional view of a fully-adhered roofing system according to embodiments of the present invention.

The fully-adhered roofing systems of the present invention can be described with reference to FIG. 4. Roofing system 40 includes a roof deck 51, optional insulation layer 53, optional protection layer 55, optional existing membrane 57, adhesive layer 60, and membrane 71, where membrane 71 is a membrane according to one or more embodiments of the present invention. For purposes of this specification, the material to which the adhesive secures the membrane, which is the uppermost layer, can be referred to as the substrate. For example, where the membrane is adhesively secured to an insulation board or layer, the insulation board or layer may be referred to as a substrate.

Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the existing membranes may include cured rubber systems such as EPDM membranes, thermoplastic polymers systems such as TPO membranes, or asphalt-based systems such as modified asphalt membranes and/or built roof systems.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510, which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g. a butyl rubber adhesive) or a polyurethane adhesive. In other embodiments, the adhesive may be a pressure-sensitive adhesive, which may be applied to the membrane at the location where the membrane is manufactured (e.g. a factory-applied pressure-sensitive adhesive).

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Various modifications and alterations that do not depart from the scope and spirit of this invention will become apparent to those skilled in the art. This invention is not to be duly limited to the illustrative embodiments set forth herein.

What is claimed is:

1. A method of making a multi-layered thermoplastic roofing membrane, the method comprising:
   (i) preparing a first planar-shaped co-extrudate that includes a thermoplastic layer including propylene-based elastomer and a thermoplastic layer that is substantially devoid of propylene-based elastomer;
   (ii) preparing a second planar-shaped co-extrudate that includes a thermoplastic layer including propylene-based elastomer and a thermoplastic layer that is substantially devoid of propylene-based elastomer; and
   (iii) laminating the first planar-shaped co-extrudate and second planar-shaped co-extrudate to each other while disposing a reinforcing fabric therebetween to thereby form a multi-layered thermoplastic roofing membrane, where laminating includes contacting the thermoplastic layer including propylene-based elastomer of the first planar-shaped co-extrudate with the thermoplastic layer including propylene-based elastomer of the second planar-shaped co-extrudate while the reinforcing fabric is disposed between the layers, and where the multi-layered thermoplastic roofing membrane is characterized by a flexural modulus of less than 90 MPa and a Taber stiffness of less than 15.

2. The method of claim 1, where the multilayer thermoplastic roofing membrane is characterized by a Shore D hardness of less than 40.

3. The method of claim 1, where the multilayer thermoplastic roofing membrane is characterized by a flexural modulus of less than 70 MPa, a Taber stiffness of less than 8, and a Shore D hardness of less than 20.

4. The method of claim 1, where the thermoplastic layer that is substantially devoid of propylene-based copolymer of the first planar-shaped co-extrudate includes from about 15 to about 50% weight percent magnesium hydroxide, and where the thermoplastic layer that is substantially devoid of propylene-based copolymer of the second planar-shaped co-extrudate includes less than 20 weight percent magnesium hydroxide.

5. The method of claim 4, where the second thermoplastic composition includes from about 25 to about 75% weight percent calcium carbonate.

6. The method of claim 5, where the third thermoplastic composition includes from about 25 to about 75% weight percent calcium carbonate.

7. The method of claim 6, where the fourth thermoplastic composition includes from about 25 to about 75% weight percent calcium carbonate.

8. The method of claim 4, where the first thermoplastic composition includes from about 20 to about 40 weight percent magnesium hydroxide, and where the fourth thermoplastic composition include less than 10 weight percent magnesium hydroxide.

9. The method of claim 8, where the second thermoplastic composition includes from about 35 to about 65% weight percent calcium carbonate.

10. The method of claim 9, where the third thermoplastic composition includes from about 35 to about 65% weight percent calcium carbonate.

11. The method of claim 10, where the fourth thermoplastic composition includes from about 35 to about 65% weight percent calcium carbonate.

12. The method of claim 1, where the fourth thermoplastic composition includes a functionalized polymer.

13. The method of claim 1, where the propylene-based elastomer is a propylene/alpha-olefin copolymer with semi-crystalline isotactic propylene segments.

14. The method of claim 13, where the propylene-based elastomer includes from about 5% to about 18% polymerized ethylene content.

15. The method of claim 14, where the propylene-based elastomer is characterized by a melting point of less than 110° C.

16. The method of claim 15, where the propylene-based elastomer is characterized by a heat of fusion of less than 75 J/g.

17. The method of claim 16, where the propylene-based elastomer has a Tg of from about −25° C. to about −35° C.

18. The method of claim 1, where the propylene-based elastomer is characterized by a flexural modulus of from about 500 to about 6000 psi.

* * * * *